(12) United States Patent
Reiner et al.

(10) Patent No.: US 6,734,310 B2
(45) Date of Patent: May 11, 2004

(54) FLUORESCENT MARKER

(75) Inventors: Knut Reiner, Wolfen (DE); Steffen Ernst, Leipzig (DE); Heinz Mustroph, Dessau (DE)

(73) Assignee: FEW Chemicals GmbH (DE)

( * ) Notice: Subject to any disclaimer, the term of this patent is extended or adjusted under 35 U.S.C. 154(b) by 0 days.

(21) Appl. No.: 10/240,980

(22) PCT Filed: Apr. 4, 2001

(86) PCT No.: PCT/EP01/03851

§ 371 (c)(1),
(2), (4) Date: Oct. 21, 2002

(87) PCT Pub. No.: WO01/77229

PCT Pub. Date: Oct. 18, 2001

(65) Prior Publication Data

US 2003/0135058 A1 Jul. 17, 2003

(30) Foreign Application Priority Data

Apr. 12, 2000 (DE) .......................... 100 18 199

(51) Int. Cl.$^7$ .......................... C09B 23/06; C09B 23/08
(52) U.S. Cl. ....................... 548/427; 548/455
(58) Field of Search ................. 548/427, 455

(56) References Cited

U.S. PATENT DOCUMENTS

| | | | | |
|---|---|---|---|---|
| 5,106,990 A | * | 4/1992 | Ohno et al. .................. | 548/427 |
| 5,268,486 A | * | 12/1993 | Waggoner et al. .......... | 548/427 |
| 5,556,959 A | | 9/1996 | Brush et al. ............. | 536/25.32 |

FOREIGN PATENT DOCUMENTS

| | | | |
|---|---|---|---|
| DE | 39 12 045 A1 | | 3/1990 |
| DE | 199 37 024 A1 | | 2/2001 |
| JP | 03217837 | * | 9/1991 |
| JP | 2000-81678 | * | 3/2000 |
| WO | WO 98/30992 | | 1/1998 |

OTHER PUBLICATIONS

Yarmoluk S. M. et al, "Interaction of cyanine dyes with nucleic acids, XII, beta–substituted carbocyanines as possible fluorescent probes for nucleic acids detection", Bioorganic & Medicinal Chemistry Letters 9, Jun. 21, 1999, pp. 1677–1678, XP004167738.
Mujumdar R. B. et al, "Cyanine Dye Labeling Reagents: Sulfoindocyanine Succinimidyl Esters", Bioconjugate Chemistry, vol. 4, No. 2, Mar. 1, 1993, pp. 105–111, XP000654181.
Article, "Cyanine Dye Labeling Reagents for Sulfhydryl Groups," Ernst et al., 1989 Alan R. Liss, Inc.
Article, "A New Method for the Synthesis of Heptamethine Cyanine Dyes: Synthesis of New Near–Infrared Fluorescent Labels," Narayanan and Patonay, J. Org. Chem. 1995, 60, 2391–2395.
Article, "New Near–Infrared Cyanine Dyes For Labelling of Proteins," Lipowska, Patonay and Strekowski Synthetic Communications, 23(21), 3087–3094 (1993).
Article, "Cyanine Dye Labeling Reagents Containing Isothiocyanate Groups," Mujumdar et al., 1989 Alan R. Liss, Inc.
Article, "Cyanine Dye Labeling Reagents—Carboxymethylindocyanine Succinimidyl Esters," Southwick et al., 1990 Wiley–Liss, Inc.
Article, "A Long–Wavelength Biolabeling Reagent Based on the Oxonol Fluorophore." Southwick et al., Journal of Fluorescence, vol. 5, No. 2, 1995.
Article, "Visibile Diode Laser–Induced Fluorescence Detection in Liquid Chromatography after Precolumn Derivatization of Amines," Mank et al., Anal. Chem. 1995, 67, 1742–1748.

* cited by examiner

Primary Examiner—Fiona T. Powers
(74) Attorney, Agent, or Firm—Piper Rudnick LLP

(57) ABSTRACT

The invention relates to cyanine dyes, which have alkyl substituents in the meso position of the methine chain, sulphoaryl groups as well as at least one reactive group which permits the binding to a target substance.

2 Claims, 1 Drawing Sheet

FLUORESCENT MARKER

Figure 1:
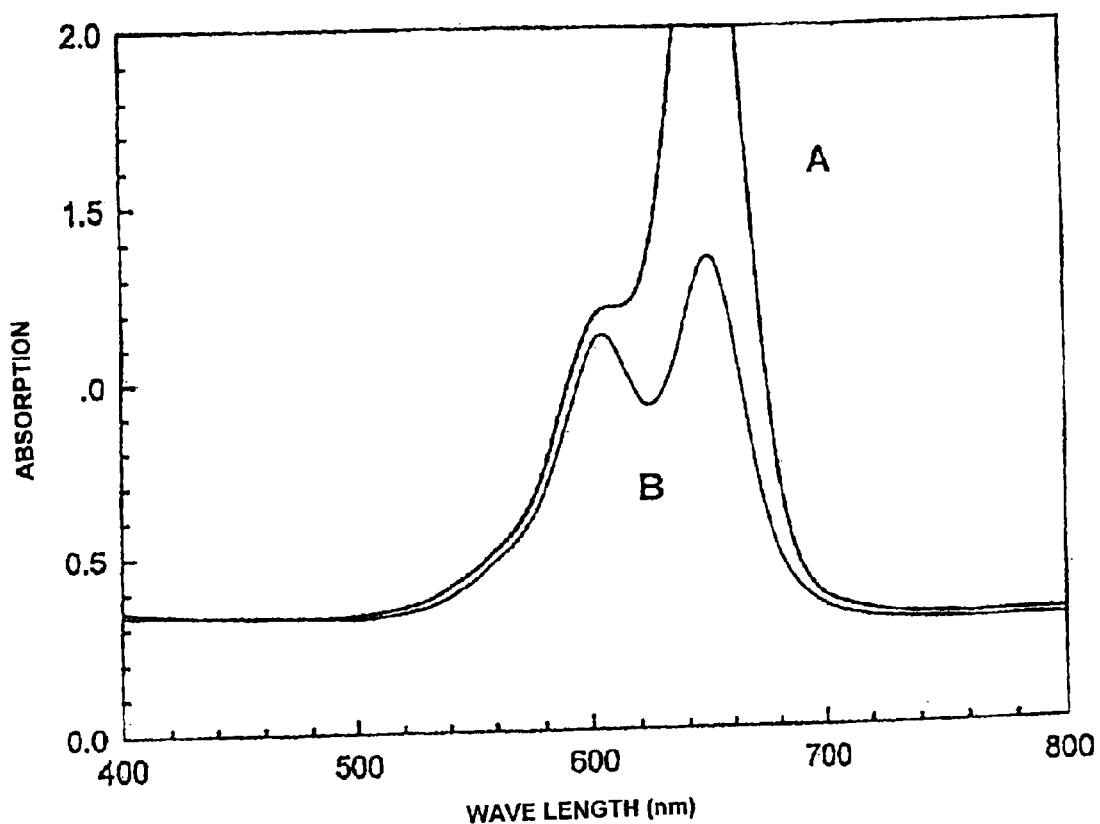

The invention relates to cyanine dyes for use as fluorescent markers.

Fluorescent dyes are used as markers in many different ways for the analysis of a major part of clinically, biologically, biochemically or chemically relevant substances, such as for example cells, antibodies, proteins, hormones, nucleic acids, oligonucleotides, carbohydrates or amines and mercaptanes. In combination with the easily detectable fluorescence induced by laser (LIF; Laser-Induced Fluorescence), rapid analyses are possible in the aforementioned areas.

By means of covalent bonding, a larger number of dye molecules are able to be attached to a specimen than is possible in the case of a non-specific non-covalent bond, so that the intensity of the fluorescent light signal is stronger. Furthermore, a covalent bond enables unequivocal marking of a specific target structure in a mixture. For covalent bonding of the fluorescent dye to the specimen, therefore, the dyes are provided with reactive groups. Suitable reactive groups are, for example, the iodacetamid group, the isothiocyanate group, N-succinimide-esters of alkyl carboxylic acids or phosophoramidites of hydroxy alkyl groups.

In the case of antibodies, proteins, hormones, nucleic acids and other biomolecules, mercapto (—SH), amino (—NH$_2$) and hydroxy groups (—OH), among others, are available.

Cyanine dyes are increasingly being used as fluorescent markers. Generally, however, cyanine dyes in solution and at surfaces tend to form aggregates [SCHEIBE: Angew. Chem. 49 (1936) 563; JELLEY: Nature 138 (1936) 1009]. These polymeric dye systems, in contrast with the individual molecule, exhibit a markedly changed absorption and fluorescence behaviour.

As a result of the aggregation, the absorption maximum may be shifted in comparison with the monomer hypsochrome (Dimers, H-aggregates) or bathochrome (J-aggregates) [DIETZE: J. Signal AM. 1 (1973) 157]. This different absorption behaviour depends on the different dislocation angle between the molecule and aggregate axis as well as the intermolecular spacing of the dyes molecules in the aggregate (packing density). Independently of these influencing variables, it was found that at least seven dye molecules are needed for the formation of J-aggregates [DALTROZZO et al.: Photogr. Sci. Eng. 20 (1974) 441], i.e. J-aggregates are only able to form with raised packing density.

It is important when using cyanine dyes as fluorescent markers in aqueous systems to prevent the formation of dye aggregates, which fluoresce much more poorly. In addition, there is the fact that the tendency towards increased dye aggregation is accompanied by an increased tendency towards non-specific interactions of the dye at an arbitrary biomolecule.

Aryl sulpho groups lead to a marked improvement in the water solubility of a dye and should at the same time prevent the formation of dimers or H-aggregates. Corresponding fluorescent markers are described in DE 3.912.046, US 5.268.486 and [MUJUMDAR et al.: Bioconjugate Chem. 4 (1993) 105].

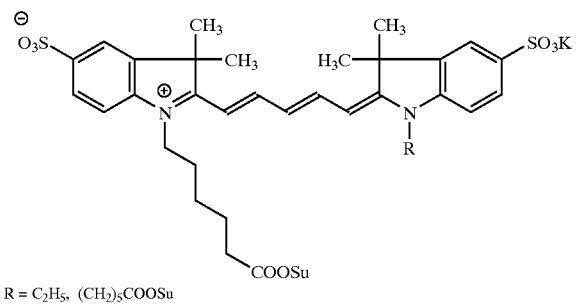

R = C$_2$H$_5$, (CH$_2$)$_5$COOSu

Using the example of the dye with the following structure

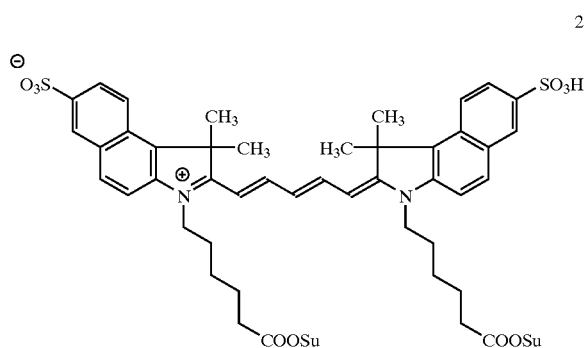

it could be shown that J-aggregates form in aqueous solution, whereas coupled with proteins, a very marked dimer band could be detected [MUJUMDAR et al.: Bioconjugate Chem. 7 (1996) 356], as a result of which a considerable fluorescence quenching occurs. It goes on to describe how the dimer formation is suppressed by the introduction of two further sulpho groups.

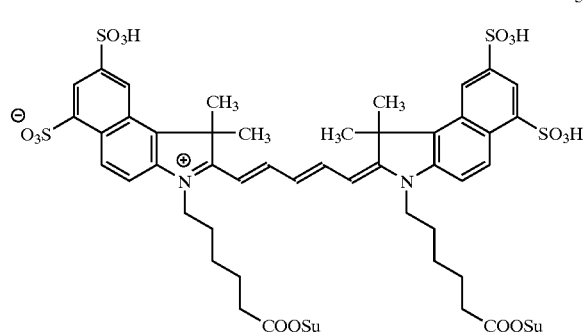

It has been shown, however, that the fluorescence quantum yield of the protein conjugates both of dye 1 and also 3 decreases by around ¼ compared with free, unconjugated dyes [MUJUMDAR et al.: Bioconjugate Chem. 7 (1996) 356; Terpetschnig: NATO Advanced Research Workshop, Conference Paper, Trieste, 1997].

The object of the invention is to provide new cyanine dyes which do not exhibit the aforementioned drawbacks and which in particular exhibit a low tendency towards aggregation both in solution as well as on the target molecule and are suitable for application as fluorescent markers in the range from 500 to 700 nm.

This object is solved by a cyanine dye with the features according to claim 1. Advantageous embodiments and applications emerge from the dependent claims.

The present invention is illustrated with reference to the figure.

FIG. 1 shows the VIS spectra of the cyanine dye according to the invention from example 1 in comparison with a known cyanine dye.

Surprisingly, it was found that, by a new combination of sulphoaryl substituents with alkyl substituents in the meso position of the methine chain, the known drawbacks of the formation of various dye aggregates in solution and also after binding to a target molecule can be eliminated. A cyanine dye according to the invention is distinguished by a combination of sulphoaryl substituents, an alkyl substituent in the meso position of the methine chain and at least one reactive group which permits the binding to target molecule.

The novel cyanine dyes can be employed with the use of various excitation light sources in the absorption range between 500 and 700 nm and, compared with conventional fluorescent dyes, possess a markedly reduced tendency to aggregation in solution and after binding to a target molecule, e.g. protein.

Preferred cyanine dyes exhibit the following formulas:

Formula 1

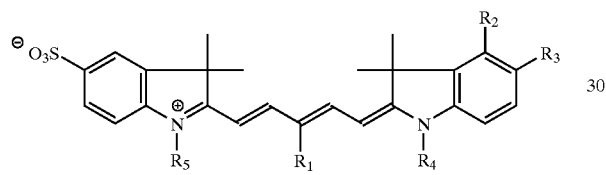

Formula 2

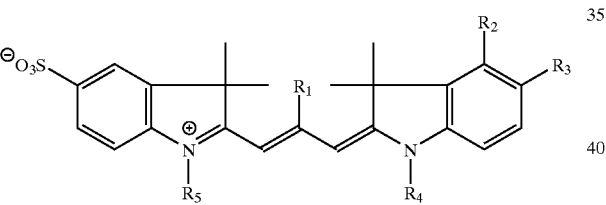

Formula 3

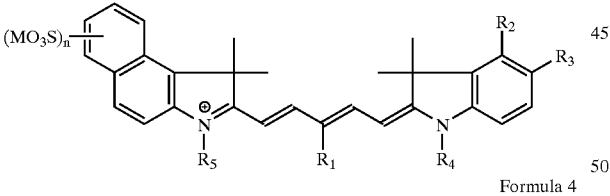

Formula 4

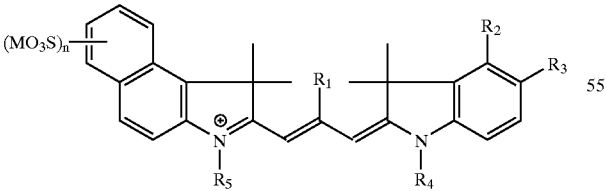

wherein n=1, 2; $R_1$ $CH_3$, $C_2H_5$; $R_2$, $R_3$=H, $SO_3M$, the four CH groups required to complete a benzene ring, or the four CH groups required to complete a benzene ring including $(SO_3M)$ n; M=H, Na, K.

In the general formulas 1 to 4, $R_4$ and $R_5$ stand for an alkyl group, a sulphoalkyl group, a carboxyl group or a hydroxyl alkyl group (e.g. $R_4=(CH_2)_kCH_3$ with k=0 to 3, $(CH_2)_mSO_3$, $(CH_2)_mCOOH$, $(CH_2)_mCH_2OH$, m=2 to 5; $R_5=(CH_2)_mCOOH$, $(CH_2)_mCH_2OH$, m=2 to 5).

In dyes with carboxyl groups, the latter can be converted into their N-succinimide-esters, which then react directly with amino groups on the biomolecule or via a so-called amino linker with hydroxy groups. In dyes with alkyl hydroxy groups, the latter can be converted into phosphoramidites, which react directly with the free 5'-hydroxy group of nucleotides to form a phosphite bond, which subsequently oxidises to form a stable phosphate bond.

It can be seen from FIG. 1 that the cyanine dyes according to the invention exhibit far better fluorescence properties in the protein conjugate than the conventional cyanine dyes. FIG. 1 shows the VIS spectra of the dye from example 1 [A] and Cy-5 [Amersham] [B] in a comparison after coupling to a protein. As can readily be deduced from the spectra, cyanine dye A according to the invention displays the typical curve shape for a monomer, whereas the development of a dimer band can clearly be recognised in the case of conventional cyanine dye B. Biomolecules can thus be readily marked with the cyanine dyes according to the invention in a perfectly satisfactory fluorescence yield.

EXAMPLES OF EMBODIMENT

Example 1

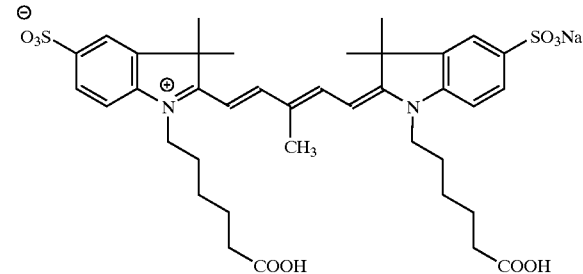

A) Sodium Salt of 1-(5-carboxypentyl)-2,3,3-trimethyl-5-sulphoindolium Bromide:

2.61 g of sodium salt of 2,3,3-trimethyl-5-sulpho-indolenine and 2.1 g of 6-bromocaproic acid are caused to react in substance for 2 h at a bath temperature of 110° C. while stirring. After the reaction is completed, acetone is added repeatedly to the oily residue until a solid remains. Yield: 3.4 g.

B) 1-(5-carboxypentyl)-2-[5-(1-(5-carboxypentyl)-1,3-dihydro-3,3-dimethyl-5-sulpho-2H-indole-2-ylidene)-3-methylpenta-1,3-dienyl]-3,3-dimethyl-5-sulpho-3H-indolium-inner Salt, Sodium Salt:

2.3 g of quaternary salt from A) and 0.68 g of 2-methyl-malondianil-hydrochloride are heated in 15 ml of ethanol in the presence of 1 ml each of acetic anhydride and triethylamine for 25 minutes under reflux. After cooling, 2 ml of 3 molar HCl is added and the dye is then precipitated by the addition of ether. ($\lambda$=647 nm)

Example 2

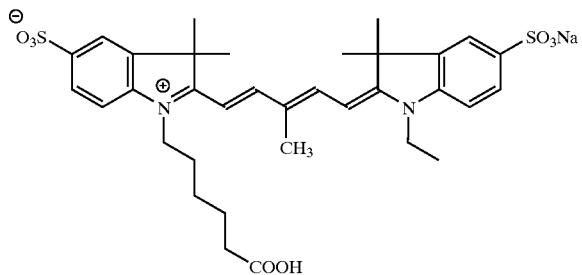

Substance A) is produced in the same way as in example 1.
B) 2-(4-acetaniline-1,3-butadienyl-3-methyl)-3,3-dimethyl-1-ethyl-5-sulphoindolium Hydroxide, Inner Salt:

26.7 g of 1-ethyl-2,3,3-trimethyl-5-sulphoindolium hydroxide and 27.3 g of 2-methylmalondianil-hydrochloride are caused to react in 80 ml of acetic anhydride for 1 h at an oil bath temperature of 120° C. After cooling, 600 ml of ethyl acetate is added and drawing off by suction carried out. Yield: 39.6 g.

C) 1-(5-carboxypentyl)-2-[5-(1,3-dihydro-1-ethyl-3,3-dimethyl-5-sulpho-2H-indole-2-ylidene)-3-methylpenta-1,3-dienyl]-3,3-dimethy-5-sulpho-3H-indolium Hydroxide, Inner Salt, Sodium Salt:

2.3 g of the compound from A) and 2.2 g of the compound from B) are dissolved in 20 ml of ethanol and, after the addition of 2 ml triethylamine, heated for 20 minutes under reflux. After the reaction is completed, the mixture is cooled to room temperature, precipitated with ether and the precipitate filtered off. The residue is mixed by stirring with acetone, filtered, absorbed in methanol and a drop of semi-concentrated HCl added. The crude dye obtained after adding diethylether is purified by means of column chromatography over silica gel. ($\lambda$=645 nm)

Example 3

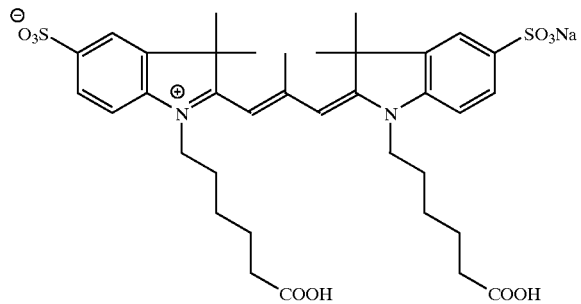

Substance A) is produced in the same way as in example 1.
B) 1-(5-carboxypentyl)-2-[3-(1,3-dihydro-1-(5-carboxypentyl)-3,3-dimethyl-5-sulpho-2H-indole-2-ylidene)-3-methylprop-1-enyl]-3,3-dimethyl-5-sulpho-3H-indolium Hydroxide, Inner Salt, Sodium Salt:

2.3 g of quaternary salt from A) and 2.4 g of orthoethyl acetate are heated in 15 ml of pyridine in the presence of 1 ml each of acetic anhydride and triethylamine for 30 minutes under reflux. After cooling, 3 molar HCl is added, the dye is then precipitated with the addition of acetone and boiled off repeatedly with isopropanol. ($\lambda$=548 nm)

Example 4

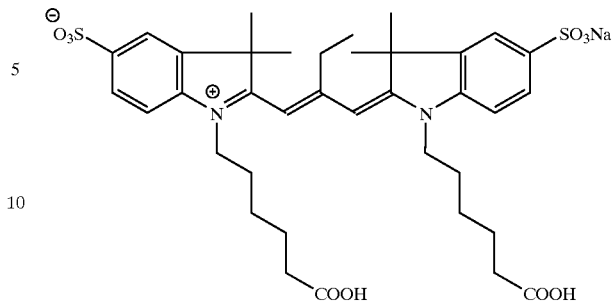

Substance A) is produced in the same way as in example 1.
B) 1-(5-carboxypentyl)-2-[3-(1,3-dihydro-1-(5-carboxypentyl)-3,3-dimethyl-5-sulpho-2H-indole-2-ylidene)-3-ethylprop-1-enyl]-3,3-dimethyl-5-sulpho-3H-indolium Hydroxide, Inner Salt, Sodium Salt:

2.3 g of quaternary salt from A) and 2.7 g of orthopropionic acid triethyl ester are heated in 15 ml of pyridine in the presence of 1 ml each of acetic anhydride and triethylamine for 30 minutes under reflux. After cooling, 3 molar HCl is added, the dye is then precipitated with the addition of acetone and boiled off repeatedly with isopropanol. ($\lambda$=549 nm).

Example 5

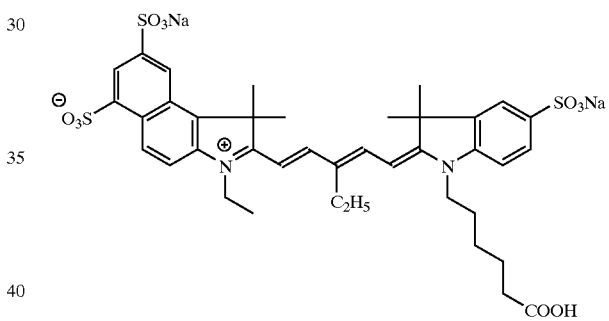

Substance A) is produced in the same way as in example 1.
B) Disodium salt of 3-ethyl-6,8-disulpho-1,1,2-trimethyl-benzo[e]-indolium-ethyl-sulphate:

4.13 g of disodium salt of 6,8-disulpho-1,1,2-trimethyl-benzo[e]-indolenine and 1.7 g of diethylsulphate are heated in 10 ml of chlorobenzene for 2 h at a bath temperature of 105° C. while stirring. After cooling to room temperature, the chlorobenzene is decanted off. The remaining residue is spread by rubbing repeatedly with acetone. Yield: 4.3 g.

C) 2-(4-acetaniline-1,3-butadienyl-3-ethyl)-1,1-dimethyl-3-ethyl-6,8-disulpho-benzo[e]-indolium Hydroxide, Sodium Salt:

28.3 g of disodium salt of 3-ethyl-6,8-disulpho-1,1,2-trimethyl-benzo[e]-indolium-ethyl-sulphate and 13.7 g of 2-methylmalondianil-hydrochloride are caused to react in 75 ml of acetic anhydride for 1 h at an oil bath temperature of 120° C. After cooling, 550 ml of ethyl acetate is added and drawing off by suction carried out. Yield: 23.5 g D) 2-[5-(l-(5-carboxypentyl)-1,3-dihydro-3,3-dimethyl-5-sulpho-2H-indole-2-ylidene)-3-ethyl-penta-1,3-dienyl]-1,1-dimethyl-3-ethyl-6,8-disulpho-1H-benzo[e]indolium-inner salt, disodium salt:

2.3 g of the compound from A) and 3.1 g of the compound from B) are dissolved in 15 ml of methanol and, after the addition of 3 ml of triethylamine, heated for 20 minutes under reflux. After cooling to room temperature, precipitation is carried out with diethyl ether. The residue is absorbed in methanol, mixed with 4 ml of acetic acid and precipitated with the addition of ether. The crude dye thus obtained is purified by column chromatography over silica gel. (λ=669 nm).

What is claimed is:

1. A cyanine dye, with a combination of sulphoaryl groups, alkyl substituents in the meso position of the methine chain and at least one reactive group which permits binding to biomolecules, said cyanine dye having one of the general structures:

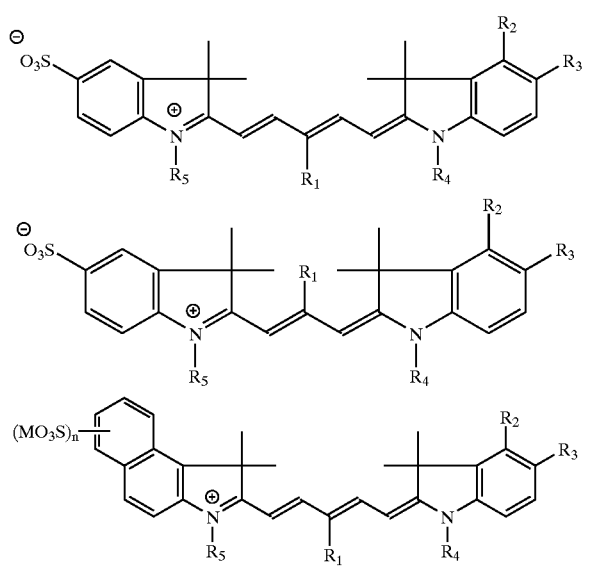

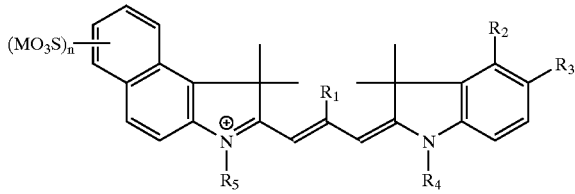

wherein n is 1 or 2, $R_1$ is $CH_3$ or $C_2H_5$, $R_2$ and $R_3$ are H, $SO_3M$ or the four CH groups required to complete a benzene ring or the four CH groups required to complete a benzene ring including $(SO_3M)_n$, whereby M is H, Na or K, and $R_4$ and $R_5$ denote equally or differently from another alkyl with 1 to 4 carbon atoms, sulpho alkyl with 2 to 4 carbon atoms, carboxy alkyl with 2 to 6 carbon atoms or hydroxy alkyl with 2 to 6 carbon atoms.

2. The cyanine dye according to claim 1, characterized in that $R_4$ and $R_5$ denote a carboxy alkyl group $(CH_2)_m COOH$, wherein m is 2 to 5, or a hydroxy alkyl group $(CH_2)_m CH_2OH$, wherein m 2 to 5, and the reactive group which permits binding to biomolecules is an N-hydroxysuccinimide-ester of said carboxy alkyl group a bis-(N,N-di-isopropyl)-β-cyanoethyl-phosphoramidite of said hydroxy alkyl group.

* * * * *